US011123604B2

(12) United States Patent
Fung

(10) Patent No.: US 11,123,604 B2
(45) Date of Patent: Sep. 21, 2021

(54) APPARATUS FOR NATURAL TORSO AND LIMBS TRACKING AND FEEDBACK FOR ELECTRONIC INTERACTION

(71) Applicant: Blue Goji LLC, Austin, TX (US)

(72) Inventor: Coleman Fung, Spicewood, TX (US)

(73) Assignee: BLUE GOJI LLC., Austin, TX (US)

( * ) Notice: Subject to any disclaimer, the term of this patent is extended or adjusted under 35 U.S.C. 154(b) by 0 days.

(21) Appl. No.: 16/951,281

(22) Filed: Nov. 18, 2020

(65) Prior Publication Data

US 2021/0069547 A1 Mar. 11, 2021

Related U.S. Application Data

(63) Continuation of application No. 17/030,195, filed on Sep. 23, 2020, which is a continuation-in-part of
(Continued)

(51) Int. Cl.
| | |
|---|---|
| *A63B 21/00* | (2006.01) |
| *A63B 24/00* | (2006.01) |
| *A63B 22/02* | (2006.01) |
| *A63B 22/00* | (2006.01) |
| *A63B 23/04* | (2006.01) |
| *G06T 19/00* | (2011.01) |
| *G06F 1/16* | (2006.01) |
| *A63F 13/65* | (2014.01) |
| *A63F 13/212* | (2014.01) |
| *A63F 13/214* | (2014.01) |

(Continued)

(52) U.S. Cl.
CPC ...... *A63B 24/0003* (2013.01); *A63B 22/0046* (2013.01); *A63B 22/0285* (2013.01); *A63B 22/0292* (2015.10); *A63B 22/06* (2013.01); *A63B 23/04* (2013.01); *A63F 13/212* (2014.09); *A63F 13/214* (2014.09); *A63F 13/40* (2014.09); *A63F 13/65* (2014.09); *G06F 1/163* (2013.01); *G06F 3/011* (2013.01); *G06F 3/016* (2013.01); *G06T 19/006* (2013.01); *H04W 84/18* (2013.01)

(58) Field of Classification Search
CPC ....................................................... A61H 3/04
See application file for complete search history.

(56) References Cited

U.S. PATENT DOCUMENTS

| | | |
|---|---|---|
| 7,883,450 B2 | 2/2011 | Hidler |
| 10,540,006 B2 | 1/2020 | Erivantcev et al. |

(Continued)

*Primary Examiner* — Lawrence S Galka
(74) *Attorney, Agent, or Firm* — Brian S. Boon; Brian R. Galvin; Galvin Patent Law LLC

(57) ABSTRACT

An apparatus for natural torso and limbs tracking and feedback for electronic interaction with fall safety support. The apparatus comprises a body harness worn on the body of a user, a support structure designed to bear the weight of the user in the event of a stumble, trip, or fall, and a plurality of tethers attached at one end to the harness and at the other end to the support structure. One or more sensors are integrated into the system to measure aspects of the user's movement and used as input to control a computer system. In the event of stumble, trip, or fall, all of, or a portion of, the user's body weight is borne by the tethers as a safety mechanism to prevent injury. The system is designed to be used with virtual reality systems wherein the user's vision is blocked or obscured by a virtual reality visor.

15 Claims, 11 Drawing Sheets

Related U.S. Application Data application No. 16/781,663, filed on Feb. 4, 2020, which is a continuation-in-part of application No. 16/354,374, filed on Mar. 15, 2019, now Pat. No. 10,549,153, which is a continuation-in-part of application No. 16/176,511, filed on Oct. 31, 2018, which is a continuation-in-part of application No. 16/011,394, filed on Jun. 18, 2018, now Pat. No. 10,155,133, which is a continuation-in-part of application No. 15/853,746, filed on Dec. 23, 2017, now Pat. No. 10,265,578, which is a continuation of application No. 15/219,115, filed on Jul. 25, 2016, now Pat. No. 9,849,333, which is a continuation-in-part of application No. 15/193,112, filed on Jun. 27, 2016, now abandoned, which is a continuation-in-part of application No. 15/187,787, filed on Jun. 21, 2016, now Pat. No. 10,124,255, which is a continuation-in-part of application No. 15/175,043, filed on Jun. 7, 2016, now Pat. No. 9,766,696, and a continuation-in-part of application No. 14/846,966, filed on Sep. 7, 2015, now Pat. No. 10,080,958, and a continuation-in-part of application No. 14/012,879, filed on Aug. 28, 2013, now Pat. No. 10,737,175.

(60) Provisional application No. 62/330,602, filed on May 2, 2016, provisional application No. 62/330,642, filed on May 2, 2016, provisional application No. 62/310,568, filed on Mar. 18, 2016, provisional application No. 61/696,068, filed on Aug. 31, 2012.

(51) Int. Cl.
*A63F 13/40* (2014.01)
*A63B 22/06* (2006.01)
*G06F 3/01* (2006.01)
*H04W 84/18* (2009.01)

(56) References Cited

U.S. PATENT DOCUMENTS

| | | | |
|---|---|---|---|
| 2003/0153438 A1* | 8/2003 | Gordon | A63B 69/0064 482/92 |
| 2007/0171199 A1 | 7/2007 | Gosselin | |
| 2011/0312473 A1* | 12/2011 | Chu | A63B 69/0064 482/54 |
| 2017/0165145 A1* | 6/2017 | Aryananda | A61G 7/1015 |
| 2017/0215802 A1* | 8/2017 | Byron | A61B 5/742 |
| 2018/0264306 A1 | 9/2018 | Agrawal et al. | |
| 2020/0230005 A1* | 7/2020 | Hidler | A61G 7/1001 |

\* cited by examiner

APPARATUS FOR NATURAL TORSO AND LIMBS TRACKING AND FEEDBACK FOR ELECTRONIC INTERACTION

CROSS-REFERENCE TO RELATED APPLICATIONS

| Application No. | Date Filed | Title |
|---|---|---|
| Current application | Herewith | APPARATUS FOR NATURAL TORSO AND LIMBS TRACKING AND FEEDBACK FOR ELECTRONIC INTERACTION Is a continuation of: |
| 17/030,195 | Sep. 23, 2020 | APPARATUS FOR NATURAL TORSO AND LIMBS TRACKING AND FEEDBACK FOR ELECTRONIC INTERACTION which is a continuation in-part-of: |
| 16/781,663 | Feb. 4, 2020 | BODY JOYSTICK FOR INTERACTING WITH VIRTUAL REALITY OR MIXED REALITY MACHINES OR SOFTWARE APPLICATIONS which is a continuation in-part-of: |
| 16/354,374 | Mar. 15, 2019 | VIRTUAL REALITY AND MIXED REALITY ENHANCED ELLIPTICAL EXERCISE TRAINER which is a continuation in-part-of: |
| 16/176,511 | Oct. 31, 2018 | VIRTUAL REALITY AND MIXED REALITY ENHANCED EXERCISE MACHINE which is a continuation in-part-of: |
| 16/011,394 U.S. Pat. No.: 10,155,133 | Jun. 18, 2018 Issue Date: Dec. 18, 2018 | SYSTEM AND METHOD FOR A MIXED OR VIRTUAL REALITY-ENHANCED STATIONARY EXERCISE BICYCLE which is a continuation in-part-of: |
| 15/853,746 U.S. Pat. No.: 10,265,578 | Dec. 23, 2017 Issue Date: Apr. 23, 2019 | VARIABLE-RESISTANCE EXERCISE MACHINE WITH WIRELESS COMMUNICATION FOR SMART DEVICE CONTROL AND INTERACTIVE SOFTWARE APPLICATIONS which is a continuation of: |
| 15/219,115 U.S. Pat. No.: 9,849,333 | Jul. 25, 2016 Issue Date: Dec. 26, 2017 | VARIABLE-RESISTANCE EXERCISE MACHINE WITH WIRELESS COMMUNICATION FOR SMART DEVICE CONTROL AND VIRTUAL REALITY APPLICATIONS which claims benefit of provisional: |
| 62/330,642 | May 2, 2016 | VARIABLE-RESISTANCE EXERCISE MACHINE WITH WIRELESS COMMUNICATION FOR SMART DEVICE CONTROL AND VIRTUAL REALITY APPLICATIONS and is also a continuation in-part-of: |
| 15/193,112 | Jun. 27, 2016 | NATURAL BODY INTERACTION FOR MIXED OR VIRTUAL REALITY APPLICATIONS which claims benefit of provisional: |
| 62/330,602 | May 2, 2016 | NATURAL BODY INTERACTION FOR MIXED OR VIRTUAL REALITY APPLICATIONS and is also a continuation in-part-of: |
| 15/187,787 U.S. Pat. No.: 10/124,255 | Jun. 21, 2016 Issue Date: Nov. 13, 2018 | MULTIPLE ELECTRONIC CONTROL AND TRACKING DEVICES FOR MIXED-REALITY INTERACTION which is a continuation in-part-of: |
| 15/175,043 U.S. Pat. No.: 9,766,696 | Jun. 7, 2016 Issue Date: Sep. 19, 2017 | APPARATUS FOR NATURAL TORSO TRACKING AND FEEDBACK FOR ELECTRONIC INTERACTION which claims benefit of provisional: |
| 62/310,568 | Mar. 18, 2016 | APPARATUS FOR NATURAL TORSO TRACKING AND FEEDBACK FOR ELECTRONIC INTERACTION |
| Current application | Herewith | APPARATUS FOR NATURAL TORSO AND LIMBS TRACKING AND FEEDBACK FOR ELECTRONIC INTERACTION Is a continuation of: |
| 17/030,195 | Sep. 23, 2020 | APPARATUS FOR NATURAL TORSO AND LIMBS TRACKING AND FEEDBACK FOR ELECTRONIC INTERACTION which is a continuation in-part-of: |
| 16/781,663 | Feb. 4, 2020 | BODY JOYSTICK FOR INTERACTING WITH VIRTUAL REALITY OR MIXED REALITY MACHINES OR SOFTWARE APPLICATIONS which is a continuation in-part-of: |
| 16/354,374 | Mar. 15, 2019 | VIRTUAL REALITY AND MIXED REALITY ENHANCED ELLIPTICAL EXERCISE TRAINER Which is a continuation in-part-of: |
| 16/176,511 | Oct. 31, 2018 | VIRTUAL REALITY AND MIXED REALITY ENHANCED EXERCISE MACHINE which is a continuation in-part-of: |
| 16/011,394 U.S. Pat. No.: 10,155,133 | Jun. 18, 2018 Issue Date: Dec. 18, 2018 | SYSTEM AND METHOD FOR A MIXED OR VIRTUAL REALITY-ENHANCED STATIONARY EXERCISE BICYCLE which is a continuation in-part-of: |
| 15/853,746 U.S. Pat. No.: 10,265,578 | Dec. 23, 2017 Issue Date: Apr. 23, 2019 | VARIABLE-RESISTANCE EXERCISE MACHINE WITH WIRELESS COMMUNICATION FOR SMART DEVICE CONTROL AND INTERACTIVE SOFTWARE APPLICATIONS which is a continuation of: |
| 15/219,115 U.S. Pat. No.: 9,849,333 | Jul. 25, 2016 Issue Date: Dec. 26, 2017 | VARIABLE-RESISTANCE EXERCISE MACHINE WITH WIRELESS COMMUNICATION FOR SMART DEVICE CONTROL AND VIRTUAL REALITY APPLICATIONS which is a continuation in-part-of: |
| 15/193,112 | Jun. 27, 2016 | NATURAL BODY INTERACTION FOR MIXED OR VIRTUAL REALITY APPLICATIONS which is a continuation in-part-of: |
| 15/187,787 U.S. Pat. No.: 10/124,255 | Jun. 21, 2016 Issue Date: Nov. 13, 2018 | MULTIPLE ELECTRONIC CONTROL AND TRACKING DEVICES FOR MIXED-REALITY INTERACTION which is a continuation in-part-of: |
| 14/846,966 U.S. Pat. No.: 10,080,958 | Sep. 7, 2015 Issue Date: Sep. 25, 2018 | MULTIPLE ELECTRONIC CONTROL DEVICES |
| | | which is a continuation in-part of: |
| 14/012,879 | Aug. 28, 2013 | MOBILE AND ADAPTABLE FITNESS SYSTEM which claims benefit of provisional: |
| 61/696,068 | Aug. 31, 2012 | MOBILE AND ADAPTABLE FITNESS SYSTEM | the entire specification of each of which is incorporated herein by reference.

BACKGROUND OF THE INVENTION

Field of the Art

The disclosure relates to the field of computer interaction, and more particularly to the field of input and output methods for interaction within software applications.

Discussion of the State of the Art

Computer and electronic device input methods have traditionally centered around the use of keyboards and pointer devices for many years. However, with the rapidly-expanding virtual reality industry, new interaction methods are being explored including a variety of controllers for gaming, wands, and motion-based input devices including gloves and camera-based hand tracking. However, these devices all focus on interacting with a user's hands, and ignore other parts of the body that could be used to improve interaction and immersion, while also expanding the possibilities for data collection.

What is needed, is a means to track the position, orientation, and movement of a user's whole body, to enable the use of their torso and limbs as a new input method. What is further needed, is a means to utilize a user's torso and limbs for two-way interaction, applying physical feedback to the user to facilitate a "whole body immersion" that is not possible through traditional control arrangements.

SUMMARY OF THE INVENTION

Accordingly, the inventor has conceived and reduced to practice, an apparatus for natural torso and limbs tracking and feedback for electronic interaction with fall safety support. The apparatus comprises a body harness worn on the body of a user, a support structure designed to bear the weight of the user in the event of a stumble, trip, or fall, and a plurality of tethers attached at one end to the harness and at the other end to the support structure. One or more sensors are integrated into the system to measure aspects of the user's movement and used as input to control a computer system. In the event of stumble, trip, or fall, all of, or a portion of, the user's body weight is borne by the tethers as a safety mechanism to prevent injury. While the system may be used to interact with any computing device, it is particularly designed to be used with virtual reality systems wherein the user's vision is blocked or obscured by a virtual reality helmet, visor, or goggles. The apparatus may further be integrated with exercise equipment such as a treadmill, stationary bike, an elliptical or a rowing machine. Wherein, force sensors under the treadmill belt measure pressure. The apparatus may then be used for virtual environments, training regiments, or telehealth.

According to a preferred embodiment, an apparatus for natural torso and limbs tracking and feedback for electronic interaction with fall protection is disclosed, comprising: a body harness comprising a plurality of attachment fixtures for tethers configured to be worn on the body of a person; a support structure comprising a plurality of attachment fixtures for tethers; a plurality of sensors configured to detect a movement of the body harness and transmit the data regarding the detected movement to a computing device; and a plurality of tethers, each tether comprising a line with a first end being affixed to an attachment fixture on the support structure at a location distal from the body of a human user and/or with a second end being affixed to an attachment fixture proximal to the body of a human user, the plurality of tethers being configured to support all or, or a portion of, the body weight of the person in the body harness from the support structure if a portion of the person's torso and limbs falls below a threshold height.

According to an aspect of an embodiment, the second end of each tether may be attached to higher or lower attachment fixtures on the support structure to adjust for height variance of different persons.

According to an aspect of an embodiment, the attachment fixtures on the support structure are adjustable to adjust for height variance of different persons.

According to an aspect of an embodiment, one or more of the plurality of sensors are strain sensors incorporated into the attachment fixtures of the body harness.

According to an aspect of an embodiment, one or more of the plurality of sensors are strain sensors incorporated into the attachment fixtures of the support structure.

According to an aspect of an embodiment, one or more of the plurality of sensors are strain sensors incorporated into the tethers.

According to an aspect of an embodiment, one or more of the sensors are current sensors which detect a current load in an electric motor around the shaft of which is wound one of the tethers.

According to an aspect of an embodiment, one or more of the sensors is an accelerometer attached to the body harness.

According to an aspect of an embodiment, one or more of the sensors is a gyroscope attached to the body harness.

According to an aspect of an embodiment, one or more of the sensors is a magnetometer attached to the body harness.

According to an aspect of an embodiment, the system further comprises exercise equipment to which the support structure is attached.

According to an aspect of an embodiment, the exercise equipment is a treadmill comprising a base and a belt.

According to an aspect of an embodiment, the exercise equipment is a stationary bike.

According to an aspect of an embodiment, the exercise equipment is an elliptical machine.

According to an aspect of an embodiment, a force sensor in or under the treadmill, stationary bike, or elliptical machine base measures downward pressure.

According to an aspect of an embodiment, the force sensor in or under the treadmill, stationary bike, or elliptical machine base is used to detect a gait or paddling pattern of the person.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
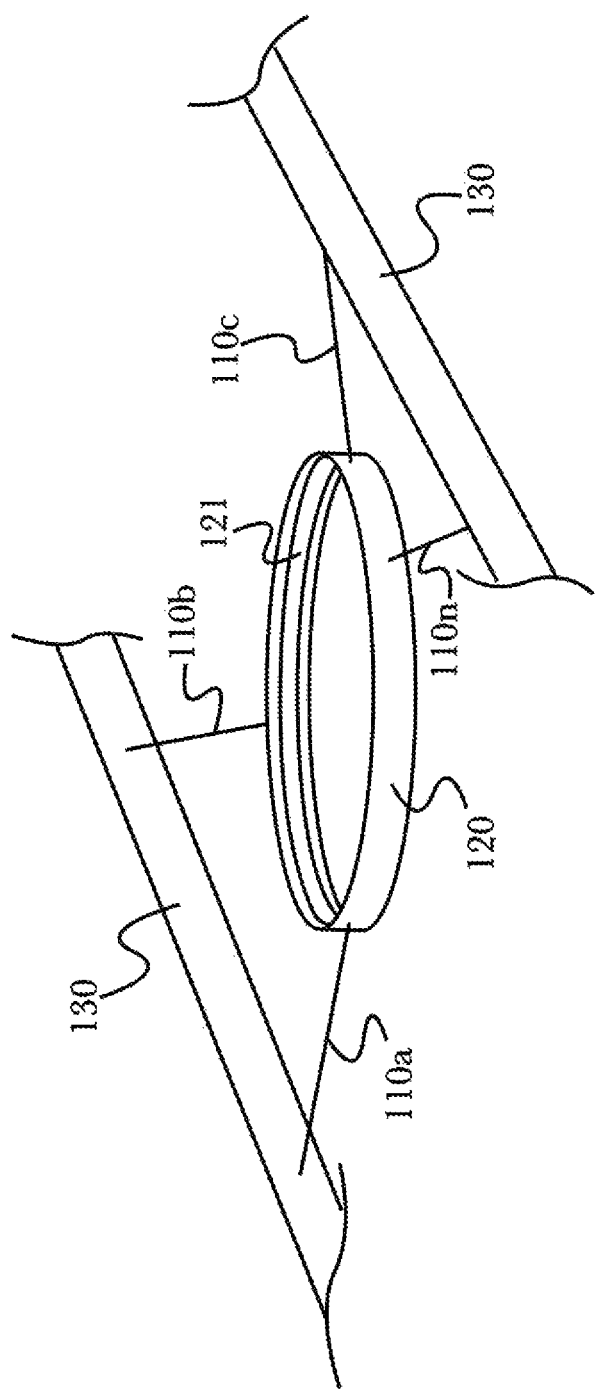
FIG. 1 is a diagram of an exemplary hardware arrangement of an apparatus for natural torso tracking and feedback for electronic interaction according to a preferred embodiment of the invention, illustrating the use of multiple tethers and a movable torso and limbs harness.

The inventor has conceived, and reduced to practice, an apparatus for natural torso and limbs tracking and feedback for electronic interaction with fall safety support. The apparatus comprises a body harness worn on the body of a user, a support structure designed to bear the weight of the user in the event of a stumble, trip, or fall, and a plurality of tethers attached at one end to the harness and at the other end to the support structure. One or more sensors are integrated into the system to measure aspects of the user's torso and limbs movement and used as input to control a computer system. In the event of stumble, trip, or fall, all of, or a portion of, the user's body weight is borne by the tethers as a safety mechanism to prevent injury. While the system may be used to interact with any computing device, it is particularly designed to be used with virtual reality systems wherein the user's vision is blocked or obscured by a virtual reality helmet, visor, or goggles.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

"Body harness," as used herein, means a belt, strap, harness, vest, jacket, or other device wearable on the hips, torso and limbs, shoulders, or arms of a person and capable of bearing all of, or a portion of, the weight of the person, and to which one or more tethers or tether attachment fixtures (e.g., motorized or non-motorized pulleys, rollers, hooks, loops, etc.) may be attached.

"Support structure," as used herein, means a frame, rail, post, or other rigid structure configured to capable of bearing the weight of a user, and to which one or more tethers or tether attachment fixtures (e.g., motorized or non-motorized pulleys, rollers, hooks, loops, etc.) may be attached. The support structure may be a fixed structure (i.e., one permanently attached to a floor, wall, ceiling, or other surface), a transportable structure (i.e., built as a movable frame), or may be part of an exercise machine (e.g., handrails, guardrails, or dedicated support pieces attached to or integrated with the exercise machine).

DETAILED DESCRIPTION OF EXEMPLARY EMBODIMENTS

FIG. 1 is a diagram of an exemplary hardware arrangement 100 for natural torso tracking and feedback for electronic interaction according to a preferred embodiment of the invention, illustrating the use of multiple tethers 110a-n and a movable torso and limbs harness 120. According to the embodiment, a plurality of tethers 110a-n may be affixed or integrally-formed as part of a handle or railing 130, such as handlebars found on exercise equipment such as a treadmill, elliptical trainer, stair-climbing machine, or the like. In alternate arrangements, specifically-designed equipment with integral tethers 110a-n may be used, but it may be appreciated that a modular design with tethers 110a-n that may be affixed and removed freely may be desirable for facilitating use with a variety of fitness equipment or structural elements of a building, according to a user's particular use case or circumstance. Tethers 110a-n may then be affixed or integrally-formed to a torso and limbs harness 120, as illustrated in the form of a belt, that may be worn by a user such that movement of their body affects tethers 110a-n and applies stress to them in a variety of manners. It should be appreciated that while a belt design for a torso and limbs harness 120 is shown for clarity, a variety of physical arrangements may be used such as including (but not limited to) a vest, a series of harness-like straps similar to climbing or rappelling equipment, a backpack, straps designed to be worn on a user's body underneath or in place of clothing (for example, for use in medical settings for collecting precise data) or a plurality of specially-formed clips or attachment points that may be readily affixed to a user's clothing. Additionally, a torso and limbs harness 120 may be constructed with movable parts, for example having an inner belt 121 that permits a user some degree of motion within the harness 120 without restricting their movement. Movement of inner belt 121 (or other movable portions) may be measured in a variety of ways, such as using accelerometers, gyroscopes, or optical sensors, and this data may be used as interaction with software applications in addition to data collected from tethers 110a-n as described below.

As a user moves, their body naturally shifts position and orientation. These shifts may be detected and measured via tethers 110a-n, for example by detecting patterns of tension or strain on tethers 110a-n to indicate body orientation, or by measuring small changes in strain on tethers 110a-n to determine more precise movements such as body posture while a user is speaking, or specific characteristics of a user's stride or gait. Additionally, through varying the quantity and arrangement of tethers 110a-n, more precise or specialized forms of movement may be detected and measured (such as, for example, using a specific arrangement of multiple tethers connected to a particular area of a user's body to detect extremely small movements for medical diagnosis or fitness coaching). This data may be used as interaction with software applications, such as for virtual reality applications as input for a user to control a character in a game. In such an arrangement, when a user moves, this movement may be translated to an in-game character or avatar to convey a more natural sense of interaction and presence. For example, in a multiplayer roleplaying game, this may be used to facilitate nonverbal communication and recognition between players, as their distinct mannerisms and gestures may be conveyed in the game through detection of natural torso and limbs position and movement. In fitness or health applications, this data may be used to track and monitor a user's posture or ergonomic qualities, or to assist in coaching them for specific fitness activities such as holding a pose for yoga, stretching, or proper running form during use with a treadmill. In medical applications, this data may be used to assist in diagnosing injuries or deficiencies that may require attention, such as by detecting anomalies in movement or physiological adaptations to an unrecognized injury (such as when a user subconsciously shifts their weight off an injured foot or knee, without consciously realizing an issue is present).

Through various arrangements of tethers 110a-n and tether sensors (as described below, referring to FIGS. 2-3), it may be possible to enable a variety of immersive ways for a user to interact with software applications, as well as to receive haptic feedback from applications. For example, by detecting rotation, tension, stress, or angle of tethers a user may interact with applications such as virtual reality games or simulations, by using natural body movements and positioning such as leaning, jumping, crouching, kneeling, turning, or shifting their weight in various directions to trigger actions within a software application configured to accept torso and limbs tracking input. By applying haptic feedback of varying form and intensity (as is described in greater detail below, referring to FIG. 2), applications may provide physical indication to a user of software events, such as applying tension to resist movement, pulling or tugging on a tether to move or "jerk" a user in a direction, or varying feedback to multiple tethers such as tugging and releasing in varying order or sequence to simulate more complex effects such as (for example, in a gaming use case) explosions, riding in a vehicle, or walking through foliage.

It should be appreciated that while reference is made to virtual reality applications, a wide variety of use cases may be possible according to the embodiment. For example, torso and limbs tracking may be used for fitness and health applications, to monitor a user's posture or gait while walking, without the use of additional virtual reality equipment or software.

Figure 2:
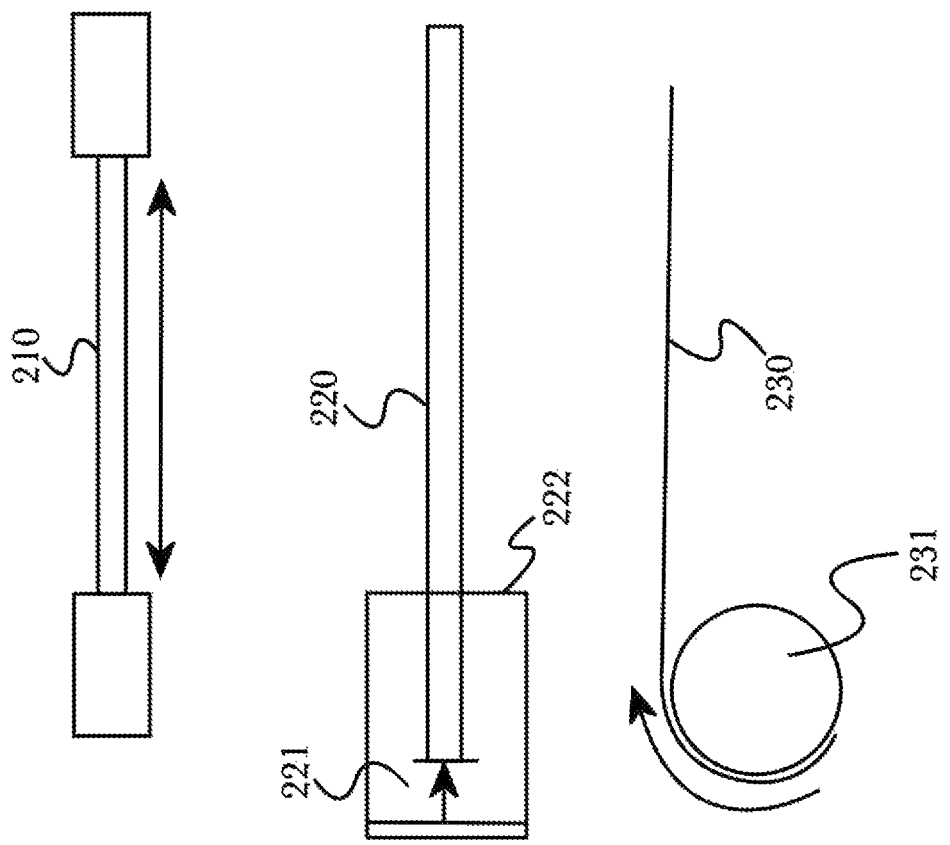
FIG. 2 is a diagram illustrating a variety of alternate tether arrangements.

FIG. 2 is a diagram illustrating a variety of alternate tether arrangements. According to various use cases and hardware arrangements, tethers 110a-n may utilize a variety of purpose-driven designs as illustrated. For example, a "stretchable" tether 210 may be used to measure strain during a user's movement, as the tether 210 is stretched or compressed (for example, using piezoelectric materials and measuring electrical changes). Such an arrangement may be suitable for precise measurements, but may lack the mechanical strength or durability for gross movement detection or prolonged use. An alternate construction may utilize a non-deforming tether 220 such as a steel cable or similar non-stretching material. Instead of measuring strain on the tether 220, instead tether 220 may be permitted a degree of movement within an enclosure 222 (for example, an attachment point on a torso and limbs harness 120 or handlebar 130), and the position or movement 221 of the tether 220 may be measured such as via optical sensors. In a third exemplary arrangement, a tether 230 may be wound about an axle or pulley 231, and may be let out when force is applied during a user's movement. Rotation of the pulley 231 may be measured, or alternately a tension device such as a coil spring may be utilized (not shown) and the tension or strain on that device may be measured as tether 230 is extended or retracted. In this manner, it may be appreciated that a variety of mechanical means may be used to facilitate tethers and attachments for use in detecting and measuring natural torso and limbs position and movement, and it should be appreciated that a variety of additional or alternate hardware arrangements may be utilized according to the embodiments disclosed herein.

Additionally, through the use of various hardware construction it becomes possible to utilize both "passive" tethers that merely measure movement or strain, as well as "active" tethers that may apply resistance or movement to provide haptic feedback to a user. For example, in an arrangement utilizing a coiled spring or pulley 231, the spring or pulley 231 may be wound to retract a tether and direct or impede a user's movement as desired. In this manner, various new forms of feedback-based interaction become possible, and in virtual reality use cases user engagement and immersion are increased through more natural physical feedback during their interaction.

By applying various forms and intensities of feedback using various tether arrangements, a variety of feedback types may be used to provide haptic output to a user in response to software events. For example, tension on a tether may be used to simulate restrained movement such as wading through water or dense foliage, walking up an inclined surface, magnetic or gravitational forces, or other forms of physical resistance or impedance that may be simulated through directional or non-directional tension. Tugging, retracting, or pulling on a tether may be used to simulate sudden forces such as recoil from gunfire, explosions, being grabbed or struck by a software entity such as an object or character, deploying a parachute, bungee jumping, sliding or falling, or other momentary forces or events that may be conveyed with a tugging or pulling sensation. By utilizing various patterns of haptic feedback, more complex events may be communicated to a user, such as riding on horseback or in a vehicle, standing on the deck of a ship at sea, turbulence in an aircraft, weather, or other virtual events that may be represented using haptic feedback. In this manner, virtual environments and events may be made more immersive and tangible for a user, both by enabling a user to interact using natural body movements and positioning, as well as by providing haptic feedback in a manner that feels natural and expected to the user. For example, if a user is controlling a character in a gaming application through a first-person viewpoint, it would seem natural that when their character is struck there would be a physical sensation corresponding to the event; however, this is not possible with traditional interaction devices, detracting from any sense of immersion or realism for the user. By providing this physical sensation alongside the virtual event, the experience becomes more engaging and users are encouraged to interact more naturally as their actions results in natural and believable feedback, meeting their subconscious expectations and avoiding excessive "immersion-breaking" moments, which in turn reduces the likelihood of users adopting unusual behaviors or unhealthy posture as a result of adapting to limited interaction schema.

Haptic feedback may be provided to notify a user of non-gaming events, such as for desktop notifications for email or application updates, or to provide feedback on their posture for use in fitness or health coaching. For example, a user may be encouraged to maintain a particular stance, pose, or posture while working or for a set length of time (for example, for a yoga exercise application), and if their posture deviates from an acceptable range, feedback is provided to remind them to adjust their posture. This may be used in sports, fitness, health, or ergonomic applications that need not utilize other aspects of virtual reality and may operate as traditional software applications on nonspecialized computing hardware. For example, a user at their desk may use an ergonomic training application that monitors their body posture throughout the work day and provides haptic reminders to correct poor posture as it is detected, helping the user to maintain a healthy working posture to reduce fatigue or injuries due to poor posture (for example, repetitive-stress injuries that may be linked to poor posture while working at a computer).

Figure 3:
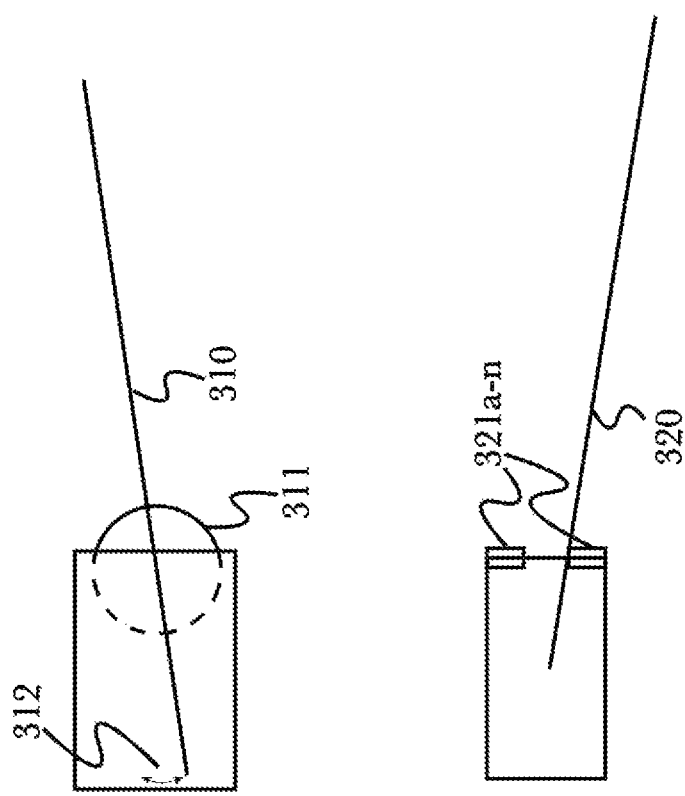
FIG. 3 is a diagram of an additional exemplary hardware arrangement of an apparatus for natural torso tracking and feedback for electronic interaction according to a preferred embodiment of the invention, illustrating the use of angle sensors to detect angled movement of tethers.

FIG. 3 is a diagram of an additional exemplary hardware arrangement 300 for natural torso tracking and feedback for electronic interaction according to a preferred embodiment of the invention, illustrating the use of angle sensors 312, 321*a-n* to detect angled movement of a tether 320. According to one exemplary arrangement, a tether 310 may be affixed to or passed through a rotating joint such as a ball bearing 311 or similar, to permit free angular movement. During movement, the angular movement or deflection 312 of a protruding bar, rod, or tether segment 313 may be measured (for example, using optical, magnetic, or other sensors) to determine the corresponding angle of tether 310. In this manner, precise angle measurements may be collected without impeding range of motion or introducing unnecessary mechanical complexity. Other embodiments include measuring the twisting angle by analyzing the tension differences from four belt pressure sensors located on the torso and limbs harness 120.

In an alternate hardware arrangement, the use of angle sensors 321*a-n* enables tracking of a vertical angle of a tether 320, to detect and optionally measure vertical movement or orientation of a user's torso and limbs. When tether 320 contacts a sensor 321*a-n*, this may be registered and used to detect a general vertical movement (that is, whether the tether is angled up or down). For more precise measurements, the specific hardware construction of a sensor 321*a-n* may be varied, for example using a pressure-sensing switch to detect how much force is applied and use this measurement to determine the corresponding angle (as may be possible given a tether 320 of known construction). It should be appreciated that various combinations of hardware may be used to provide a desired method or degree of angle detection or measurement, for example using a conductive tether 320 and a capacitive sensor 321*a-n* to detect contact, or using a mechanical or rubber-dome switch (as are commonly used in keyboard construction) to detect physical contact without a conductive tether 320.

The use of angle detection or measurement may expand interaction possibilities to encompass more detailed and natural movements of a user's body. For example, if a user crouches, then all tethers 110a-n may detect a downward angle simultaneously. Additionally, data precision or availability may be enhanced by combining input from multiple available sensors when possible (including cameras for example, utilizing adaptive software to collect data from any sensors that it detects, without requiring specific sensor types for operation), for example by combining data from tethers 110a-n and hardware sensors such as an accelerometer or gyroscope, enabling multiple methods of achieving similar or varied types or precision levels of position or movement detection. Similarly, when a user jumps then all tethers may detect an upward angle simultaneously. However, if a user leans in one direction, it may be appreciated that not all tethers 110a-n will detect the same angle. For example, tethers 110a-n in the direction the user is leaning may detect a downward angle, while those on the opposite side would detect an upward angle (due to the orientation of the user's torso and limbs and thus a worn torso and limbs harness 120). In this manner, more precise torso and limbs interaction may be facilitated through improved detection and recognition of orientation and movement. Additionally, it may be appreciated that sensors 321a-n may be utilized for other angle measurements, such as to detect horizontal angle. For example, if a user is wearing a non-rotating torso and limbs harness 120, when they twist their body a similar stress may be applied to all attached tethers 110a-n. Without angle detection the precise nature of this movement will be vague, but with horizontal angle detection it becomes possible to recognize that all tethers 110a-n are being strained in a similar direction (for example, in a clockwise pattern when viewed from above, as a user might view tethers 110a-n during use), and therefore interpret the interaction as a twisting motion (rather than, for example, a user squatting or kneeling, which might apply a similar stress to the tethers 110a-n but would have different angle measurements).

Figure 4:
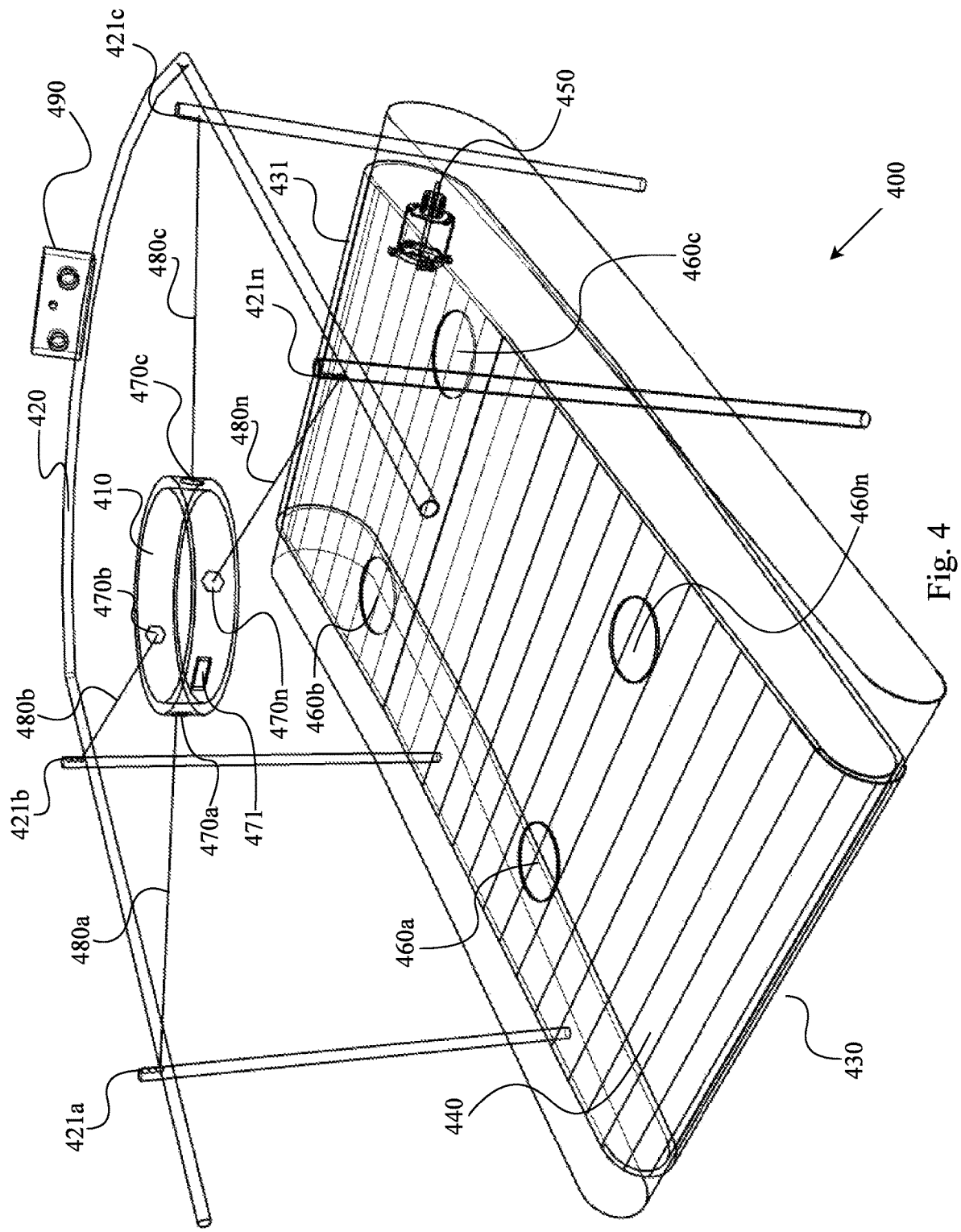
FIG. 4 is a diagram of an additional exemplary hardware arrangement of an apparatus for full body tracking and feedback for electronic interaction according to a preferred embodiment of the invention.

FIG. 4 is a diagram of an additional exemplary hardware arrangement of an apparatus for full body tracking and feedback for electronic interaction according to a preferred embodiment of the invention. According to the embodiment, a frame or structure 420 surrounds or is directly attached to a treadmill device 400 and has attachment points 421a-n at varying heights for the previously disclosed torso and limbs harness 410 or other wearable devices. The attachment points 421a-n may be implemented as hooks, loops, or other connectors that allow the for accommodation of varying heights of users. The treadmill device 400 comprising a curved form where the lowest point 430 of the treadmill belt 440 is behind the user and the highest point in front of the user 431. As the user steps forward, towards the upwards curvature of the belt 431, the user's foot strikes the belt, and gravity forces the belt back down towards the user returning to equilibrium.

Additionally, a non-powered electric motor 450 is mounted internal to the treadmill 400 and the treadmill belt 440 is connected to the motor 450 drive shaft. Pressure sensors 460a-n mounted under the belt 440 provide a computer system the users weight in which the computer uses to vary the electrical resistance of the motor 450 such that the physical resistance and upwards curvature 431 of the belt 450 gives the user an experience of simulated forward motion indistinguishable from actual forward motion. The amount of electrical resistance between the leads of the motor 450 may be adjusted to vary the resistance provided to the belt by the motor. Initially, the resistance between the leads of the electric motor can be set to keep the belt 440 from moving too easily but allows the user to start moving the belt under the same friction and force as would naturally be required walking off of the treadmill 400. Furthermore, the calculated electrical resistance used by the computer system may be used as a zeroing point, or baseline, so that the back-electromotive force created by the users motion on the belt 440 can be used as a varying voltage input to a computer system. In some embodiments, a powered electric motor can be used to the same effect.

The pressure sensors 460a-n may further be used to capture to position of the feet on the belt 440 by calculating the transverse and sagittal axis force vectors relative to each sensor 460a-n against the user's total weight. In the same fashion, shifting of the user's body may also be obtained. The pressure sensors 460a-n capture vertical motion as the user walks, runs, bobs, jumps, or squats by considering the displacement and velocity measured on individual pressure sensors 460a-n rather than relative to the others. Combining these measurements, the characteristics of a user's gait (e.g., step frequency, step impact, weight distribution, etc.) may also be obtained for use in computer applications.

According to this embodiment, the torso and limbs harness 410 has sensors 470a-n proximal to the user connected to tethers 480a-n and may comprise flex sensors, strain gauges, or other force sensors. Additional embedded components within the torso and limbs harness 410 comprise input sensors such as accelerometers, gyroscopes, magnetometers, motion, touch, smart health devices, MEMS (micro-electromechanical system) devices, and location sensors. The sensors 471 may also be output sensors such as vibration motors, fans, actuators, piezoelectric discs, and other output devices designed to stimulate or alert the user.

The torso harness 410 may be fastened by a plurality of tethers 480a-n. In one embodiment, elastic tethers 480a-n may be designed for a specific range of motion bound by maximum and minimum elasticity regarding all three planes of motion. The elasticity limits may be designed for physical safety (i.e., stumble, trip, or fall protection) while wearing a VR headset or by individuals suffering from diminished motor control such as physical rehabilitation, recent surgeries, or age-related decline. The range of motion may also be limited by sensors 470a-n connected to the proximal (or distal) ends such as strain sensors with a limited sheer strength or axis sensors with multi-planar limits. It should be appreciated that the designed elasticity of the tethers 480a-n may be a balance of both safety and physical limitations.

In this embodiment, the height of the tethers and belt may be adjusted by placing a loop on the distal end of each tether on one of a series of hooks. Other means of adjusting the height of the tethers and belt may be used, for example, telescoping poles, sliding hooks, or pulleys attached at a relatively high point from which the belt may be lowered by adjusting the length of the tether (either manually or via motors).

According to an additional embodiment, fixed length straps may be used or a combination of fixed and elastic tethers, or straps or belts connected to actuators or motors operated by a computer which controls the travel distance of each tether 480a-n accordingly. Combination fixed and elastic tethers may use either separate non-elastic tethers or integrated non-elastic tether components to place a hard limit on the stretch length of each tether, which can provide additional load bearing capabilities to catch a user during a fall. Any number of embodiments may be imagined by those skilled in the art.

Affixed to the front of the treadmill is a motion sensing input device 490. In this embodiment, the motion sensing input device comprises RGB cameras, infrared projectors and detectors that map depth, and a microphone array, along with artificial intelligence software to allow the device to perform real-time gesture recognition, skeletal detection, and fine and gross motor movement detection. In other embodiments, the motion sensing device may be simpler in operation, such as an ultrasonic distance sensor. Simpler versions of the motion sensing input device 490 can be used to determine the user's body position front to back on the treadmill, whereas more complicated motion sensing input devices 490 can be used to identify different parts of the body and their relative positions and directions (e.g., arms, legs, torso and limbs, head, etc.), as well as being combined with other sensors to confirm such actions as jumping and twisting motions. Another example is a sensor device that inserts into a user's shoe that can supplement additional details for gait analysis and a balance profile.

The treadmill 400 comprising the self-propelled and variable-resistive belt 440, motion sensing input device 470, pressure sensors 460*a-n*, tethers 480*a-n*, and various torso and limbs harness embodiments described in FIGS. 1-4 provide the detailed tracking of both fine and gross motor skills covering the entire body. It should be appreciated that the dimensionality of input and body tracking and accuracy thereof provided by these embodiments allow for a broader range of control schemes and implementations than is available in the art. Besides the obvious implications for the VR/AR and gaming industry, this platform may assist in telehealth applications (i.e., remote health assessments and treatment) allowing doctors to diagnose and treat a range of ailments related to range of motion, physical therapy, balance, routine check-ups, geriatric care, and may be further extended by integrating heart rate monitors, blood-pressure monitors, electrocardiograms, and other smart wearable technology. Telehealth applications may be of particular use in sparsely populated areas or in other situations where in-person healthcare is limited, such as quarantines or where the patient is non-mobile.

Figure 5:
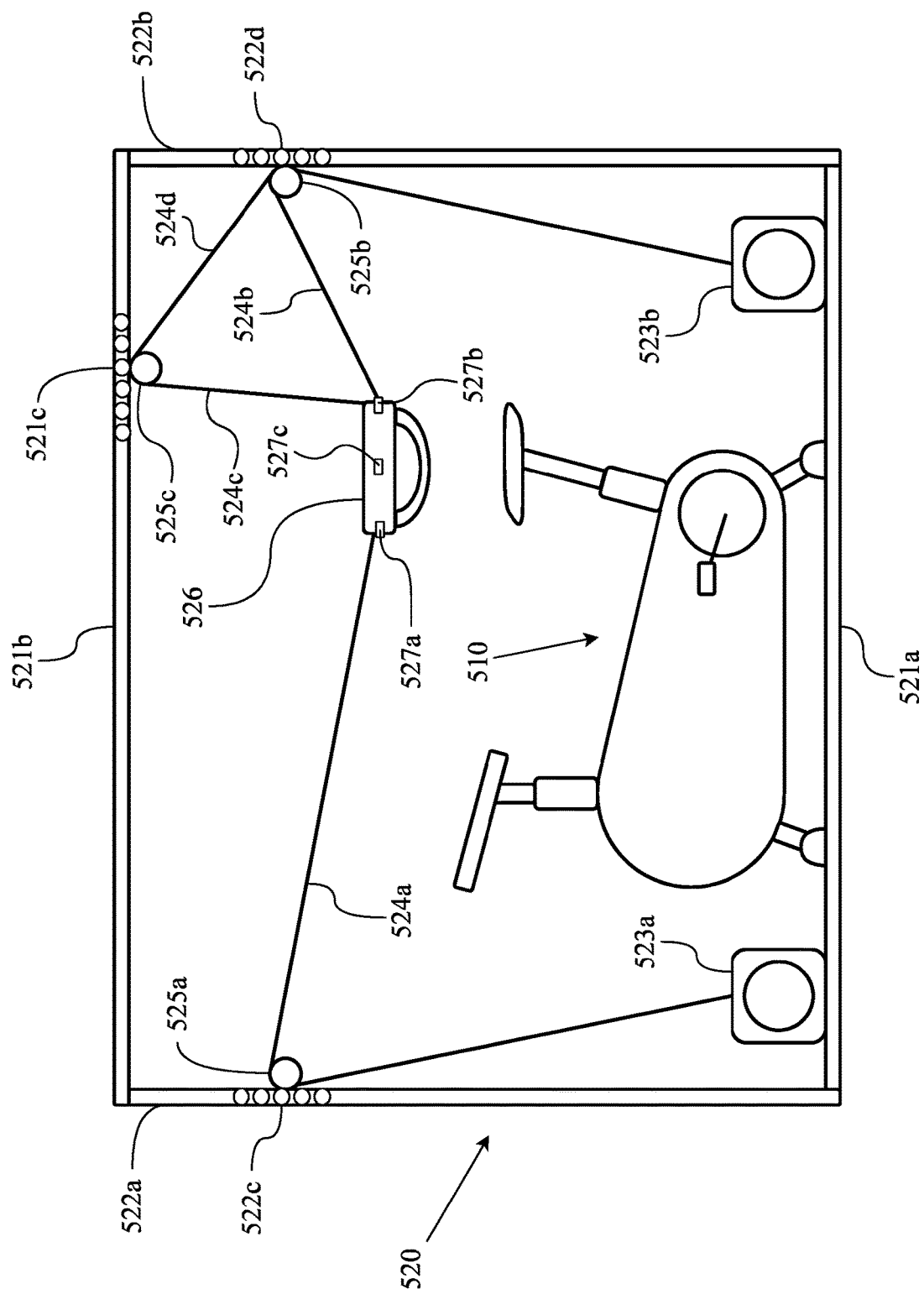
FIG. 5 is an exemplary human/machine interface and support system for using body movements to interface with computers while engaging in exercise.

FIG. 5 is an exemplary human/machine interface and support system for using body movements to interface with embedded or external computers while engaging in exercise. In this embodiment, an exercise machine 510 is placed inside a frame 520 which contains components for sensing the movement of an individual, providing haptic feedback, and providing support in case of a fall. In this embodiment, the exercise machine 510 is depicted as a stationary bicycle, although any type of exercise machine 510 (e.g., treadmill, elliptical machine, stair-stepper, rowing machine, weight-lifting machines, etc.) may be used. The exercise machine 510 may contain or be in communication with an embedded or external computer that communicates with other components of the system, although in some embodiments, the exercise machine 510 is not communicatively coupled with other components. In some embodiments, no exercise machine 510 at all is used, and the individual may freely engage in exercise or other physical movement such as running in place, jumping, dancing, lifting barbells or free weights, etc.

The frame 520 comprises a base support 521*a*, a top support 521*b*, and one or more vertical supports 522*a,b*. Mounted to an adjustable point 521*c*, 522*c,d* on one or more of the supports 521*b*, 522*a,b* are one or more pulleys or routing devices 525*a,b,c*, which guide one or more tethers 524*a,b,c,d* at a height above the waist level of the individual during exercise. The tethers 524*a,b,c,d* are attached at one end to a belt, harness, vest, or other device 526 attachable to the body of the individual, and fitted with input and/or output sensors 527*a,b,c*, and at the other end to sensors/actuators 523*a,b*. In this embodiment, the sensors/actuators 523*a,b* are electric motors fitted with rotary encoders and the tethers 524*a,b* are wound around a drum on the shaft of the motors. Sensors 527*a,b* are strain sensors or other types of force sensors, and sensors 527*c* comprise an accelerometer, gyroscope, and magnetometer. In this way, body movements of the individual may be sensed and recorded as rotational movements of the drum, triple-axis acceleration, velocity, and position from the accelerometer, angular velocity from the gyroscope, and triple-axis orientation from the magnetometer. For example, the linear distance of movement may be calculated from the number of rotations and the circumference of the drum and further calculated and compared with the data from the sensor 527*c*. Linear speed may be calculated as the linear distance over time. The position of the individual may be calculated from speed and distance. The rotational movement, linear distance, linear speed, or other calculations may be used to control the computing device or the output from a computing device such as a game, virtual reality environment, etc. Further, the motors of the sensors/actuators 523*a,b* may also act as actuators, and varying voltages and currents may be applied to the motors to provide haptic feedback to the individual, such as resistance to movement, jerking, or vibration. This haptic feedback may be provided in response to interactions with the computer, such as to indicate game events, interactions with the virtual reality environment, etc. In one aspect, the belt 526, tethers 524*a,b,c,d*, and sensors/actuators 523*a,b*, may be used to support the individual in case of a slip or fall. Such support may be provided passively (e.g., a fixed resistance provided by the motors), actively (e.g., by sensing an acceleration and applying a resistance to the tethers), or by mechanical means (e.g., seatbelt-type mechanical locking mechanism that locks the tether upon a sudden pull).

Other embodiments may use additional vertical or horizontal supports 521*a,b*, 522*a,b*, tethers 524*a,b,c,d*, and sensors/actuators 523*a,b*. For example, some embodiments may have vertical supports 522*a,b* and associated equipment at the front and back, and at the left and right sides of the individual. Sensors 527*c* may be swapped out for output sensors such as vibrating motors, buzzers, Peltier cells, and other devices which provide stimulus to the user. Many other configurations are possible.

Figure 6:
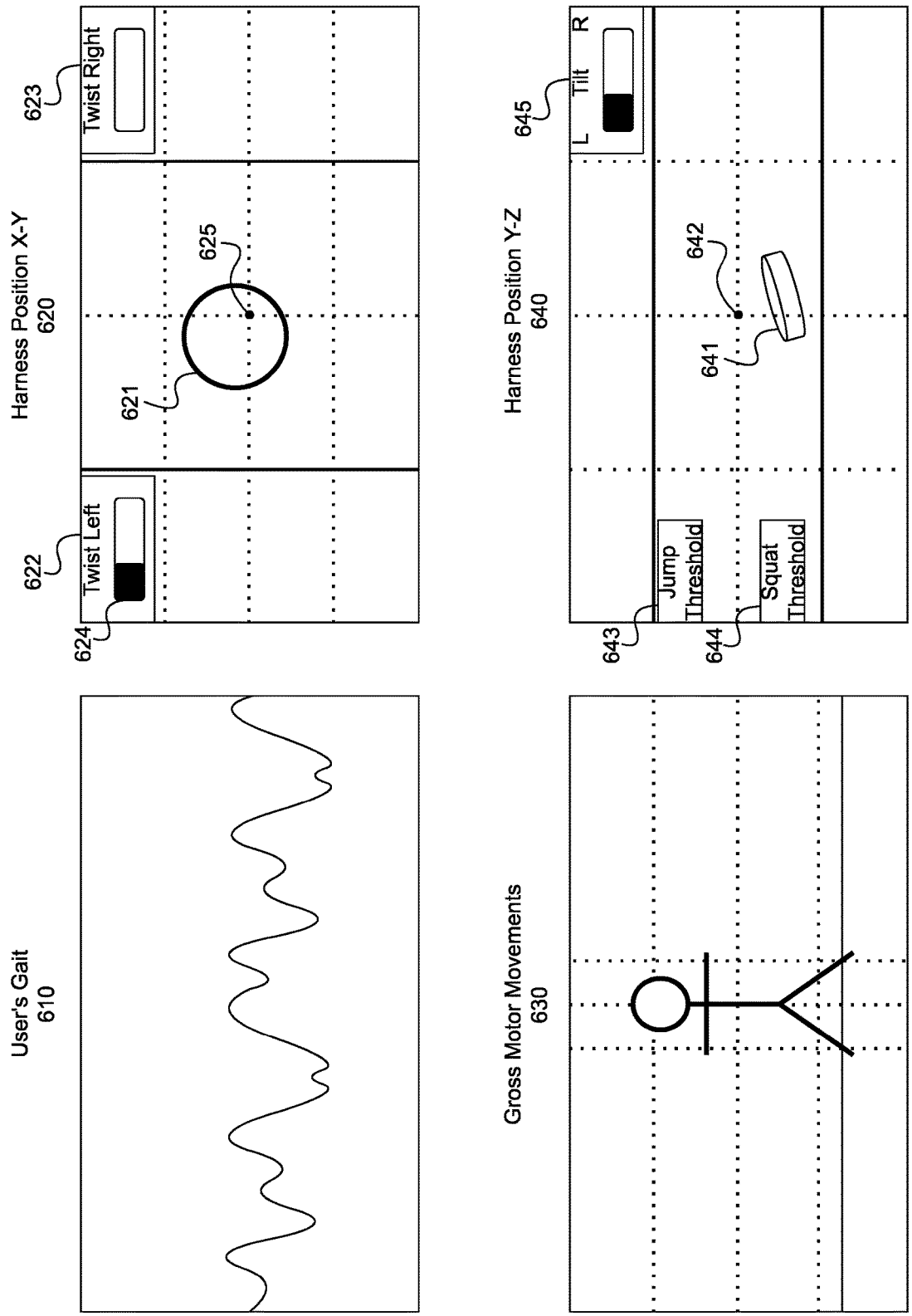
FIG. 6 is a diagram illustrating a plurality of exemplary embodiments of captured data points by a computing device and their uses according to a preferred embodiment of the invention.

FIG. 6 is a diagram illustrating a plurality of exemplary embodiments of captured data points by a computing device and their uses according to a preferred embodiment of the invention. According to this embodiment, pressure sensors under the treadmill belt may capture a user's gait 610 by plotting the relative force between pressure sensors over time. Multiple datasets can be combined to improve the accuracy of the gait parameter calculations. For example, according to one embodiment, the first step of calculating the values of gait parameters is defining each gait cycle. One gait cycle can be defined as the period between successive maximum values on the front-right load sensor, indicating two successive ground contacts from the right foot. One gait cycle could also be defined as the period between successive ground contacts of the same foot using the camera body tracking data. Two sources of data for the same parameter provides for a more accurate analysis. The load sensor data could be integrated with the camera body tracking data to ensure that a gait cycle is not missed if the user fails to make contact with the front-right load sensor.

Accelerometers, gyroscopes, and/or magnetometers in the torso and limbs harness 621 may be used to determine the harness's position by taking the second time derivative from the accelerometer readings. Twisting by the user in the harness 621 may be measured and displayed 622, 623 by taking readings from the gyroscope and magnetometer, rotary encoders, or a combination of sensors given that linear velocity is equivalent to angular velocity multiplied by position. The amount of twist may be displayed by a gradient bar representing the typical limits of human contortion at the hips, or by any other metric desired by the user. In this example, the user has twisted to the left 624 approximately one-quarter of the typical limit. Also, in this example, the user is forward and left from center 625. In other embodiments, the camera 490 may be used in conjunction with markers on the torso and limbs harness to track movement (e.g., small colored balls could be attached to the harness and tracked by the camera 490).

Gross motor movements 630 may be captured by a motion sensing device coupled with data from the sensors on the proximal and/or distal ends of the tethers and data from input sensors in the harness itself. A computer system may use the combination of data to position the user in a virtual environment, display the user's range of motion to a telehealth professional, or monitor the user's form during an exercise routine activating a vibrating motor if the user needs to correct their form.

Other positional data may be obtained and displayed via the plurality of sensors such as the harness's position 641 relative to the resting or calibrated baseline position 642. Data from the Y-Z harness position 640 can detect jumps 643 or squats 644 by formulating thresholds of position and may further be verified or supplemented by the gross motor movements 630 data and X-Y positional data 620. In this example, the tilt of the harness is measured and displayed 645 as the user squats meanwhile the harness position 641 crosses the squat threshold 644 indicating the user has in fact performed a squat.

Figure 7:
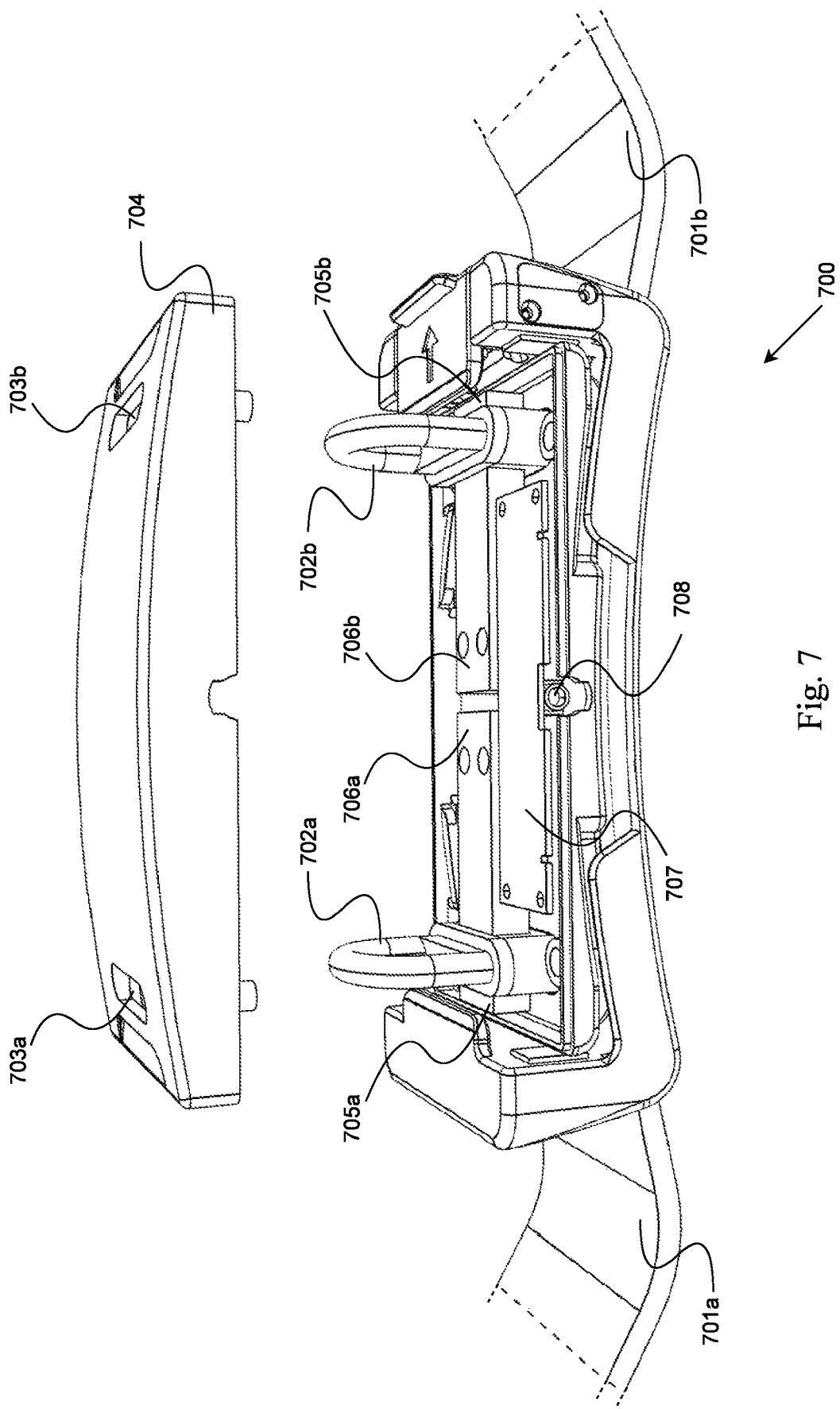
FIG. 7 is a diagram of an exemplary measurement and security device attached to a user.

FIG. 7 is a diagram of an exemplary measurement and security device attached to a user. According to this embodiment, a measurement device 700 depicted here is one of two worn on a belt 701a,b where one is on the left side of the user's body and the other is on the right side of the user's body. Two D-rings 702a,b protrude out of holes 703a,b in the device's cover 704 and are used to affix the harness to a supporting structure surrounding a piece of exercise equipment. The D-rings 702a,b are secured to one end of a load cell 705a,b, where a load cell measures strain between two ends. This end is free-standing where the opposite end 706a,b is securely fastened to the device 700.

The load cell is provided a small electrical current and when a force is applied to the D-ring side 705a,b a voltage relating to the amount of strain can be measured. Because there are two of these devices 700 providing a total of four measurement points, differential loads on the four measurement points can be used to determine whether and how much a user twists and turns his or her torso. Measurements can also be used to tighten or loosen tethers to provide feedback or prevent a user from falling.

Additional features include a computing device 707 (the back side of a circuit board being shown here) which can send the voltage measurements over wired or wireless communication protocols (such as USB, WiFi, Bluetooth, and others). The computing device 707 may also comprise an accelerometer, gyroscope, magnetometer, other sensing device, or a combination thereof. A port 708 may also be added to allow for wired communication, power charging capabilities, audio output, or other electronic uses.

Figure 8:
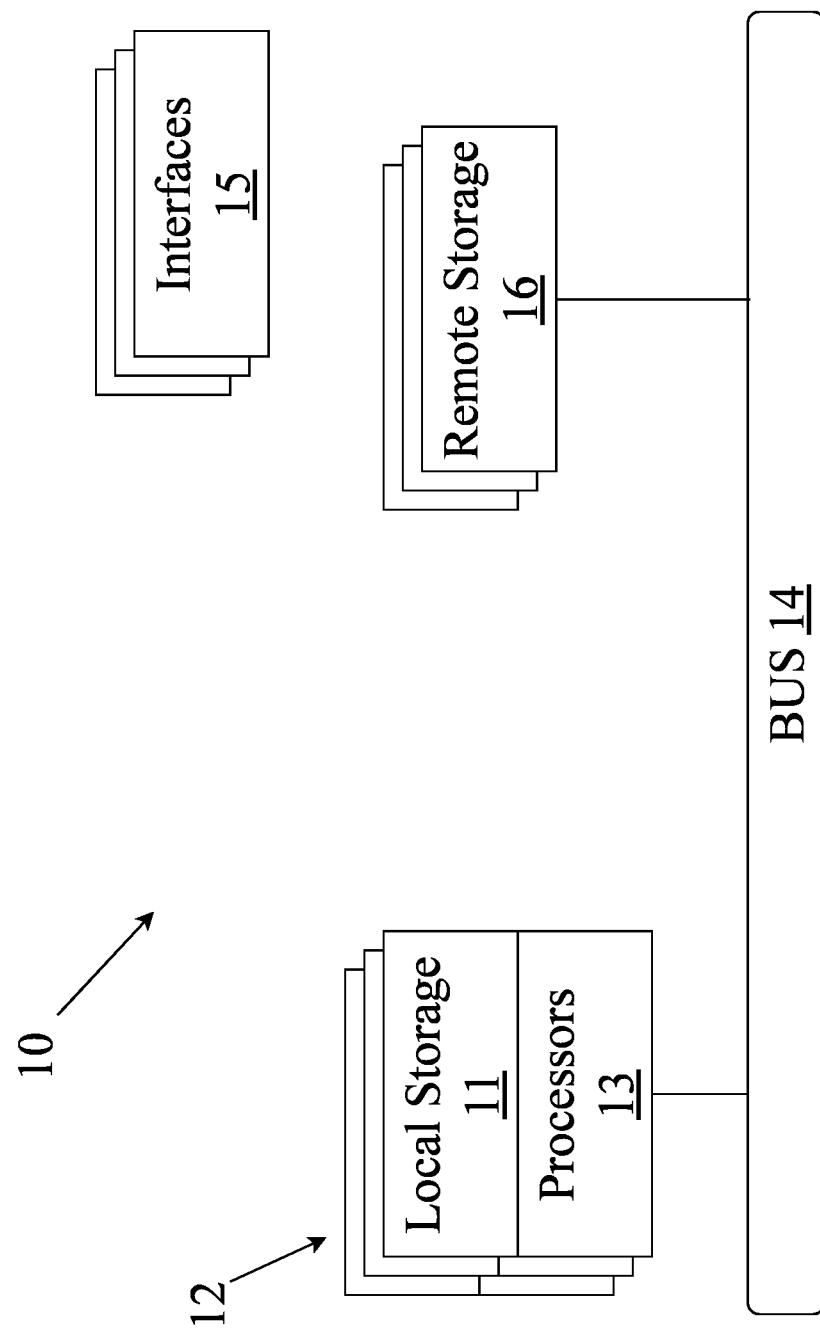
FIG. 8 is a block diagram illustrating an exemplary hardware architecture of a computing device used in an embodiment of the invention.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 8 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
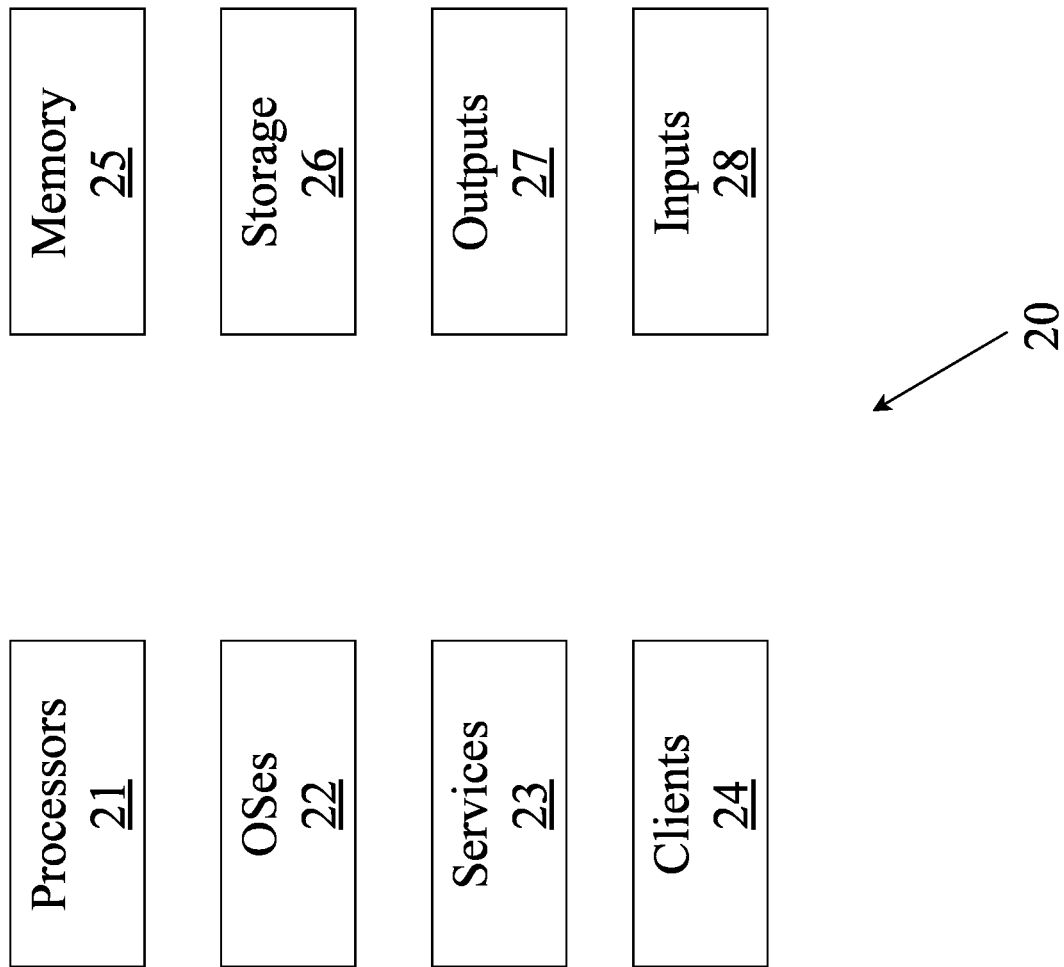
FIG. 9 is a block diagram illustrating an exemplary logical architecture for a client device, according to an embodiment of the invention.

In some embodiments, systems according to the present invention may be implemented on a standalone computing system. Referring now to FIG. 9, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, household gaming devices such as Microsoft XBOX™, Sony PLAYSTATION™, or virtual reality hardware devices such as Oculus RIFT™, HTC VIVE™, Samsung GEAR VR™, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
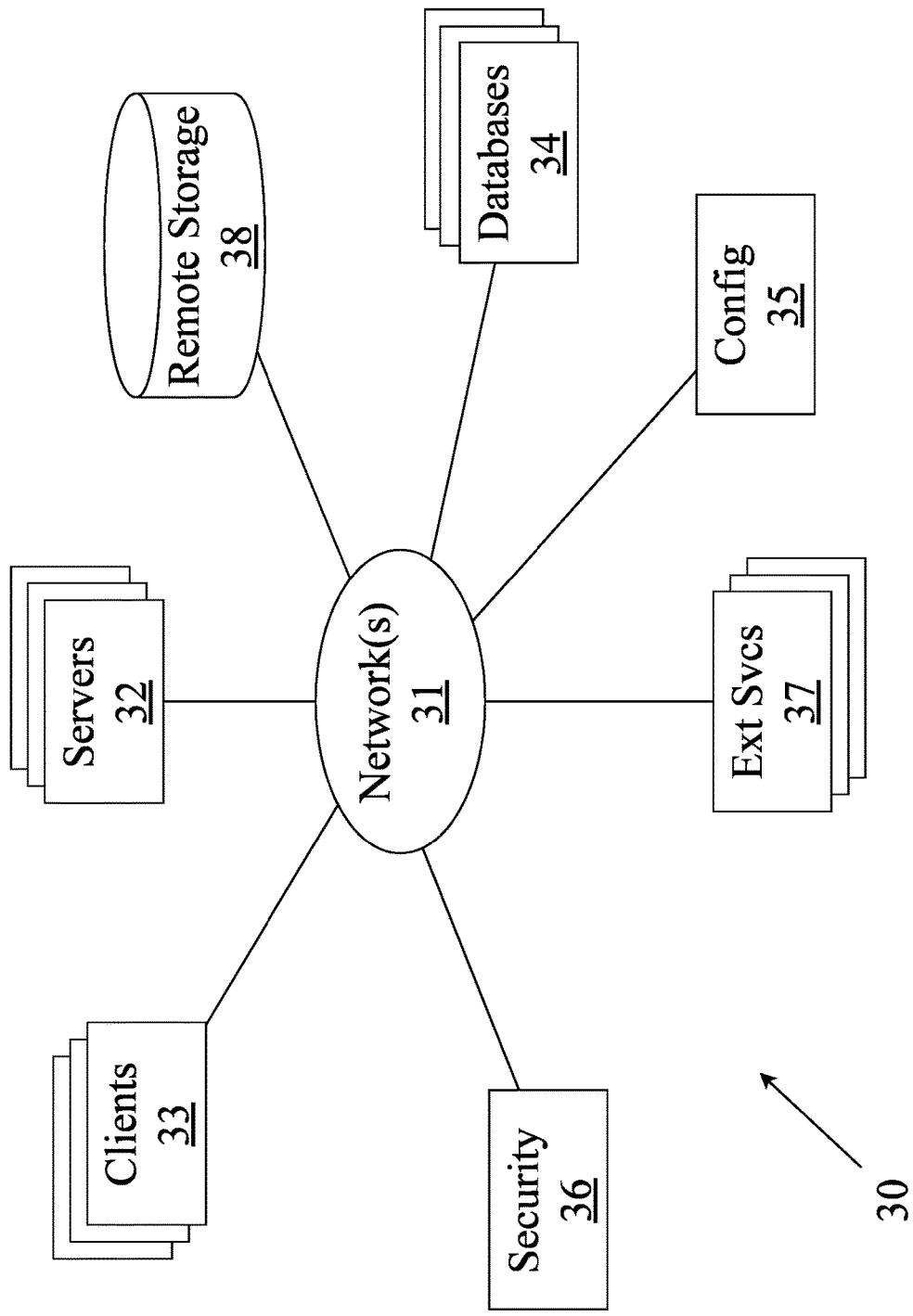
FIG. 10 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 10, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 11:
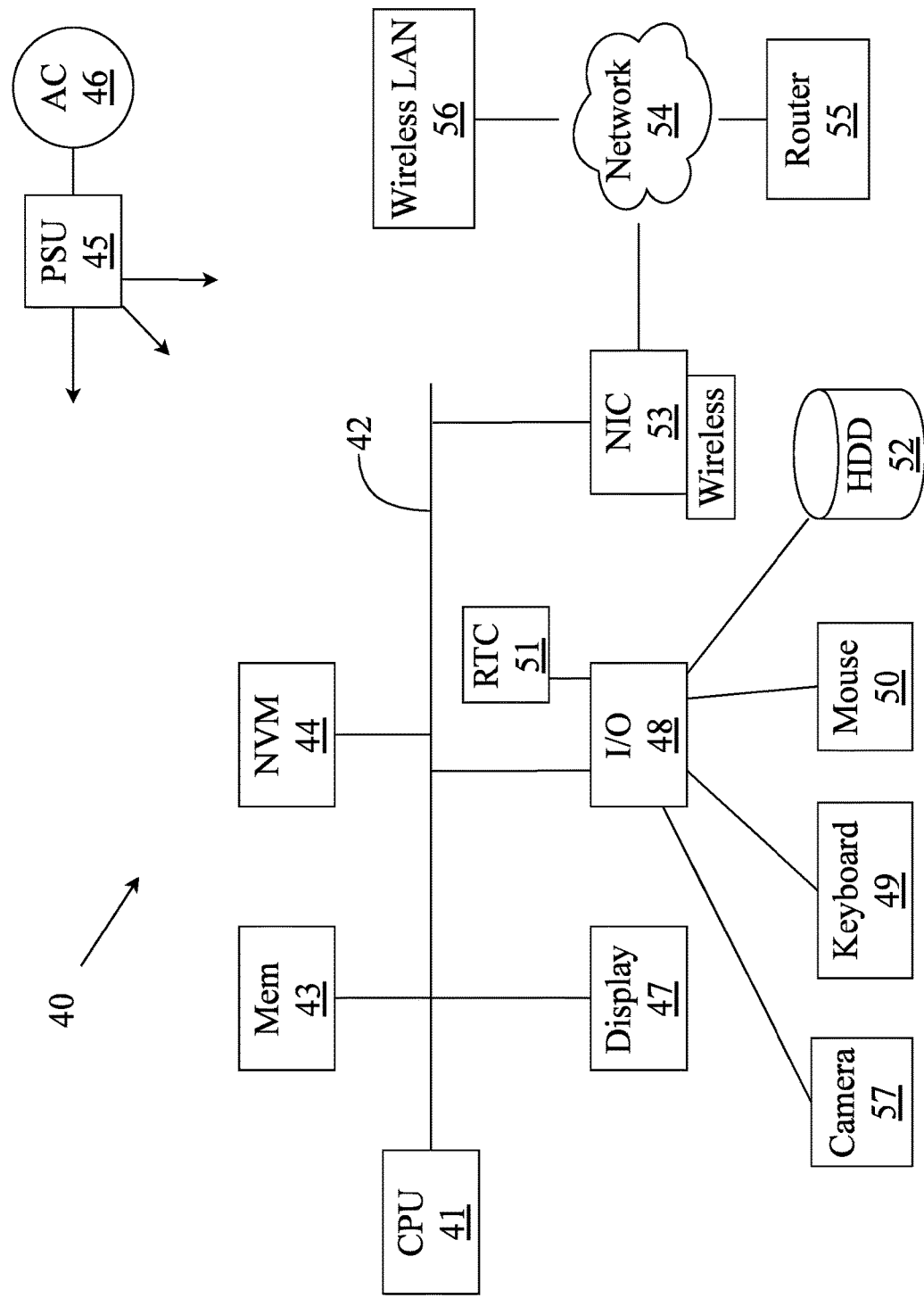
FIG. 11 is another block diagram illustrating an exemplary hardware architecture of a computing device used in various embodiments of the invention.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. An apparatus for natural torso and limbs tracking and feedback for electronic interaction with fall protection, comprising:
   a body harness comprising a first plurality of attachment fixtures for a plurality of tethers, the body harness configured to be worn on the body of a person;
   a support structure comprising a second plurality of attachment fixtures for the plurality of tethers;

one or more sensors configured to detect a movement of the body harness and transmit the data regarding the detected movement to a computing device, wherein at least one of the sensors is an accelerometer attached to the body harness; and the plurality of tethers, each tether comprising a line with a first end being affixed to one of the first plurality of attachment fixtures on the body harness and with a second end being affixed to one of the second plurality of attachment fixtures on the support structure, the plurality of tethers being configured to support all of, or a portion of, the body weight of the person in the body harness from the support structure if the body harness falls below a threshold height.

2. The apparatus of claim 1, wherein the second end of each tether may be attached to higher or lower attachment fixtures on the support structure to adjust for height variance of different persons.

3. The apparatus of claim 1, wherein the attachment fixtures on the support structure are adjustable to adjust for height variance of different persons.

4. The apparatus of claim 1, wherein at least one of the sensors is a strain sensor incorporated into the attachment fixtures of the body harness.

5. The apparatus of claim 1, wherein at least one of the sensors is a strain sensor incorporated into the attachment fixtures of the support structure.

6. The apparatus of claim 1, wherein at least one of the sensors is a strain sensor incorporated into the tethers.

7. The apparatus of claim 1, wherein at least one of the sensors is a current sensor which detect a current load in an electric motor around the shaft of which is wound one of the tethers.

8. The apparatus of claim 1, wherein at least one of the sensors is a gyroscope attached to the body harness.

9. The apparatus of claim 1, wherein at least one of the sensors is a magnetometer attached to the body harness.

10. The apparatus of claim 1, further comprising exercise equipment to which the support structure is attached.

11. The apparatus of claim 10, wherein the exercise equipment is a treadmill comprising a base and a belt.

12. The apparatus of claim 10, wherein the exercise equipment is a stationary bike.

13. The apparatus of claim 10, wherein the exercise equipment is an elliptical machine.

14. The apparatus of claim 10, wherein a force sensor incorporated into the exercise equipment measures downward pressure.

15. The apparatus of claim 14, wherein the force sensor incorporated into the exercise equipment is used to detect a gait or pedaling pattern of the person.

* * * * *